US012586097B2

(12) United States Patent
Kim et al.

(10) Patent No.: US 12,586,097 B2
(45) Date of Patent: *Mar. 24, 2026

(54) SYSTEM AND METHOD FOR PROVIDING VIRTUAL ITEMS TO USERS OF A VIRTUAL SPACE

(71) Applicant: Kabam, Inc., Vancouver (CA)

(72) Inventors: John Kim, San Francisco, CA (US); Kevin Lee, Fremont, CA (US); Kevin Chanthasiriphan, San Francisco, CA (US); Wei-Ling Wu Deckinga, Cupertino, CA (US); Tomi Huttula, San Rafael, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,066

(22) Filed: Nov. 30, 2023

(65) Prior Publication Data

US 2024/0104594 A1 Mar. 28, 2024

Related U.S. Application Data

(63) Continuation of application No. 18/163,777, filed on Feb. 2, 2023, now Pat. No. 11,869,026, which is a
(Continued)

(51) Int. Cl.
*G06Q 30/02* (2023.01)
*A63F 13/847* (2014.01)
(Continued)

(52) U.S. Cl.
CPC ....... *G06Q 30/0209* (2013.01); *A63F 13/847* (2014.09); *A63F 13/87* (2014.09);
(Continued)

(58) Field of Classification Search
CPC ............ G06Q 30/0209; G06Q 30/0214; A63F 13/847; A63F 13/87; A63F 2300/575; G06F 3/048; G06T 19/00
See application file for complete search history.

(56) References Cited

U.S. PATENT DOCUMENTS 8,777,754 B1 * 7/2014 Santini .................. G07F 17/326
                                                              705/80
9,220,985 B1 * 12/2015 Auterio ................ A63F 13/216
(Continued)

OTHER PUBLICATIONS

King et al., "Video Game Structural Characteristics: A New Psychological Taxonomy," Int J Ment Health Addiction (2010) 8:90-106 (Year: 2010).*

*Primary Examiner* — John Van Bramer
(74) *Attorney, Agent, or Firm* — Esplin & Associates, PC

(57) ABSTRACT

Participation by multiple users in an online game through client computing platforms associated with the users is facilitated. User accounts associated with the users indicate affiliations having a functional significance between users. Presentation of offers to sell virtual items are provided to users having a first affiliation and to users having a second affiliation. The virtual items associated with the offers are distributed to the users having a first affiliation upon an indication that a threshold number of users having the first affiliation have accepted the offer and are not distributed to users having a second affiliation upon an indication that a threshold number of users having the second affiliation have not accepted the offer.

16 Claims, 4 Drawing Sheets

Related U.S. Application Data continuation of application No. 17/749,937, filed on May 20, 2022, now Pat. No. 11,587,106, which is a continuation of application No. 17/241,026, filed on Apr. 26, 2021, now Pat. No. 11,436,622, which is a continuation of application No. 16/034,857, filed on Jul. 13, 2018, now Pat. No. 10,990,994, which is a continuation of application No. 14/161,396, filed on Jan. 22, 2014, now Pat. No. 10,026,093.

(51) Int. Cl.

| | | |
|---|---|---|
| *A63F 13/87* | (2014.01) | |
| *G06F 3/048* | (2013.01) | |
| *G06Q 30/0207* | (2023.01) | |
| *G06Q 30/0214* | (2023.01) | |
| *G06T 19/00* | (2011.01) | |

(52) U.S. Cl.
CPC ......... *G06F 3/048* (2013.01); *G06Q 30/0214* (2013.01); *G06T 19/00* (2013.01); *A63F 2300/575* (2013.01)

(56) References Cited

U.S. PATENT DOCUMENTS

| | | | | |
|---|---|---|---|---|
| 9,363,221 | B1 * | 6/2016 | Ozog | H04L 67/306 |
| 2004/0266505 | A1 * | 12/2004 | Keam | A63F 13/533 463/1 |
| 2011/0313840 | A1 * | 12/2011 | Mason | H04W 4/029 705/14.35 |
| 2013/0005475 | A1 * | 1/2013 | Mahajan | A63F 13/85 463/42 |
| 2013/0005480 | A1 * | 1/2013 | Bethke | A63F 13/798 463/43 |
| 2013/0079075 | A1 * | 3/2013 | Osvald | A63F 13/87 463/7 |

* cited by examiner 80　　　　　84　　　　　86

82

88

90

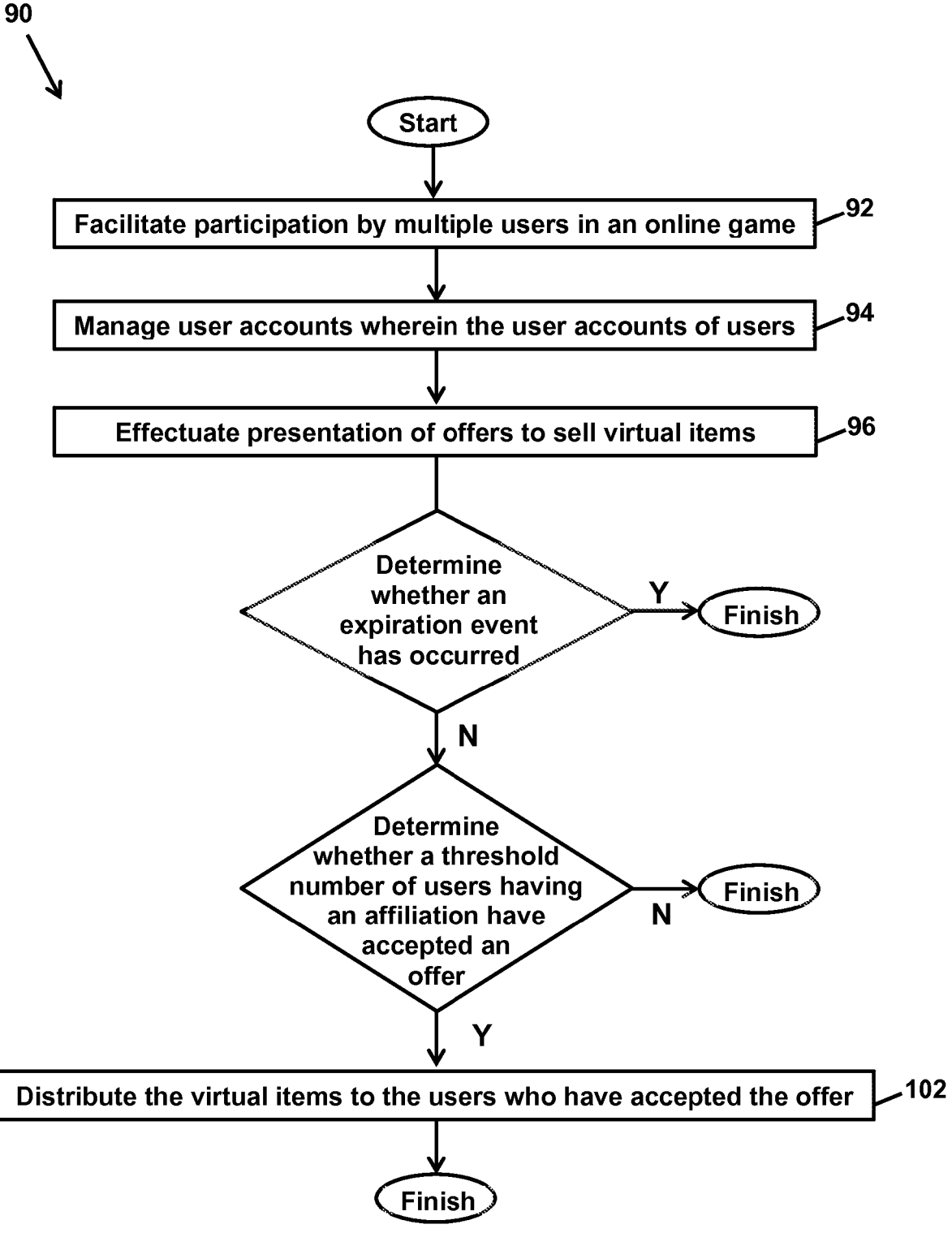

Start

Facilitate participation by multiple users in an online game — 92

Manage user accounts wherein the user accounts of users — 94

Effectuate presentation of offers to sell virtual items — 96

Determine whether an expiration event has occurred

Y → Finish

N

Determine whether a threshold number of users having an affiliation have accepted an offer N → Finish

Y

Distribute the virtual items to the users who have accepted the offer — 102

Finish

FIG. 4

SYSTEM AND METHOD FOR PROVIDING VIRTUAL ITEMS TO USERS OF A VIRTUAL SPACE

FIELD OF THE DISCLOSURE

This disclosure relates to providing virtual items to users of a virtual space, and in particular providing offers to sell virtual items to users having an affiliation.

BACKGROUND

Providing virtual items in a game is known. Many online games, and app-based games are free-to-play games which provide users the opportunity to enhance the game by purchasing one or more virtual items which are usable in the online game. Oftentimes a player of the online game will be provided the opportunity to purchase virtual currency in exchange for real world currency. Players may then exchange the real world currency for virtual items within the online game.

It is also known to have one or more conditions set on the availability of the virtual items purchasable in an online game. For example, a player may have to have reached a particular level within the game before being allowed to purchase certain virtual items.

SUMMARY

Until recently, the distribution of virtual items in a virtual space have been focused on the individual user of the virtual space. Limits and conditions have been based on the individual virtual user's status or level within the online game.

One aspect of the disclosure relates to providing virtual items to users of an online, such the virtual items are only available to a first set of users after at least a threshold number of the first set of users satisfy one or more conditions. Such conditions, for example, may be that a threshold number of users have purchased, or committed to purchase, the virtual item in a virtual shop associated with a virtual space. Another aspect of the disclosure relates to providing virtual items that increase in potency with an increase in the number of users of the set of users that satisfy one or more conditions. Such conditions, for example, may be that the users have exchanged virtual currency for the virtual item, and each time a user from the set of users obtains the virtual item the potency of that virtual item increases, such that the users of the set of users who have purchased the virtual item receive the same higher potency virtual item.

One aspect of the disclosure relates to a system that provides virtual items to users of a virtual space. The server(s) may be configured to communicate with one or more client computing platforms according to a client/server architecture. The users of the system may access the system and/or a virtual space, (e.g., a virtual world, a game space, an online game, etc.) via the client computing platforms. The system may comprise one or more physical processors configured by machine-readable instructions to facilitate participation by multiple users in an online game through client computing platforms associated with the users.

Processors may be configured by machine-readable instructions to manage user accounts, wherein the user accounts are associated with the users. The user accounts of the users may include indications of one or more affiliations having a functional significance between users. For example, the accounts of users may include a first user account for a first user having an indication that the first user is associated with a first affiliation, and may have a second user account for a second user having an indication that the second user is associated with the first affiliation.

The first user and the second user may be members of the same affiliation having a functional significance within the online game. Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as obtaining, acquiring, sharing and/or trading goods, services, player characters, and/or items in the virtual space; and/or other capabilities among users belonging to an affiliation.

Processors may be configured by machine-readable instructions to effectuate presentation of offers to sell virtual items to the users on the client computing platforms associated with users. The processors may be configured to facilitate selection and/or entry by the users of an acceptance of the offer. For example, a first offer to sell virtual items may be presented to the first user and the second user, and the first user and the second user may select and/or enter their desire to accept the first offer. The accounts of users may include a third user account for a third user having an indication that the third user is associated with a second affiliation. Presentation of the first offer to sell virtual items to the third user may be effectuated. The first user and second user may be a member of a first affiliation, and the third user may be a member of a second, different, affiliation. Both the first and second users, and the third user may be presented the same offer to purchase virtual items.

Processors may be configured by machine-readable instructions to effectuate distribution of the virtual items to the users having one or more affiliations in response to an indication that a threshold number of users associated with one or more affiliations have accepted the offer. For example, the virtual items associated with the first offer may be provided to the first user and the second user in response to an indication that a threshold number of users associated with the first affiliation, of which the first user and the second user are members, have accepted the first offer. The third user, being associated with a second affiliation, different from the first affiliation, may not receive the virtual items associated with the first offer, if a threshold number of members associated with the second affiliation failed to accept the first offer.

The offers to sell virtual items may include an associated user cost, such that the first offer to sell virtual items includes a first associated user cost. Distributing virtual items to users of an affiliation only when a threshold number of users have accepted the first offer, and having a user cost associated with the offer, will increase revenue and encourage conversion of users through social pressure to accept the offer, thereby increasing revenue for the provider of the virtual space.

In some instances, when a threshold number of users of an affiliation have failed to accept the offer to purchase virtual items, those users who have accepted the offer in exchange for, say, virtual currency, may forfeit the virtual currency exchanged. Forfeiting the virtual currency incentivizes those users associated with an affiliation who have accepted the offer to pressure the users of an affiliation who have not accepted the offer, to do so. In other instances, the users who have accepted the offer may not forfeit the virtual currency exchanged, either by receiving a refund of the virtual currency, or by it not being taken from accounts associated with the users until the occurrence of an event determining that a threshold number of users of an affiliation have, or have not, accepted the offer.

The amount of the associated user cost of the offer to sell virtual items may vary with the amount of users having a common affiliation that accept the offer, such that the first associated user cost for the first offer varies with the amount of users having the first affiliation whom accept the first offer. In some implementations, the more users who accept the offer, the lower the associated user cost of the offer, thereby incentivizing users having a common affiliation to accept the offer.

The virtual items associated with the offers to sell virtual items may have one or more benefit levels associated with a benefit provided to users. A benefit provided to users by one or more virtual items may be an increase in the user's and/or a user character's strength, power, skill, and/or abilities compared to other users of the virtual space. For example, a user may have one or more associated troop units with the benefit provided to the user being a defensive benefit, an offensive benefit, and/or other military benefits within the game. As another example, a user may be one or more resource gathering units with the benefit provided to the user being a resource gathering benefit, and/or other benefits provided within the game.

The benefit level associated with a benefit provided by the virtual items of the offer to sell virtual items may vary with the amount of users having a common affiliation that have accepted the offer. For example, the virtual items of the first offer to sell virtual items may include a first benefit level associated with a first benefit provided to a first user. The first benefit level of the first offer may vary with the amount of users having the first affiliation whom accept the first offer. In some instances, the more users having a first affiliation that accept the offer, the higher the benefit level of the virtual item associated with the offer. In such implementations, every time a user from a first affiliation accepts an offer to purchase, say, troops, the number of troops received increases by a defined amount, such that all users of the first affiliation who have accepted the offer to purchase troops receive the increased number of troops. An increase in the number of troops may increase the benefit provided to the user wherein the benefit may be a defensive benefit, an offensive benefit, and/or other military benefits within the game. As another example, where the virtual item is a resource gathering unit, the greater the number of users of an affiliation that accept the offer the greater the ability of the resource gathering to gather resources, thereby increasing the benefit to the user.

Presentation of the offers to sell virtual items to the users on the client computing platforms may be effectuated during a defined period, thereby giving users belonging to an affiliation a defined period of time to accept the offer and secure it for their co-affiliation users. Individual ones of users of an affiliation may have control over the parameters of the defined period. Such individuals may be the owner, controller, leader or commander of the affiliation. For example, a first user having a first affiliation may define the period during which presentation of the offers to sell virtual items to users having the first affiliation is effectuated. Before the start of the period to accept the virtual offer begins, the leader of the affiliation may notify all members of the affiliation when period is scheduled to begin, thereby increasing the likelihood that the threshold number of affiliation members accept the offer, allowing the affiliation members to benefit from accepting the offer.

Distribution of the virtual items associated with offers may be effectuated to the users having one or more affiliations in response to an indication that the users of the one or more affiliations have accepted the offers at a defined rate of acceptance. For example, in order to receive the virtual items, the offers may have to be accepted at a rate of one per minute, ten per five minutes, one per ten seconds, etc., over a defined period of time.

The virtual items in the offers to sell virtual items may include a set of potential awards having a set of award probabilities. The system may stochastically or quasi-stochastically select a first potential award from the set of potential awards as an actual award for distribution to users who have accepted the offer. The set of potential awards may include a desired award, such as a rare virtual item, or a virtual item having a usually high associated user cost. The probability of selecting the desired award as the actual award, for distribution to individual ones of the users who have accepted the offer, may increase with the number of users of the first set of users who have accepted the offer.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4 illustrates a method for providing virtual items to multiple users of a virtual space, in accordance with one or more implementations.

DETAILED DESCRIPTION

Figure 1:
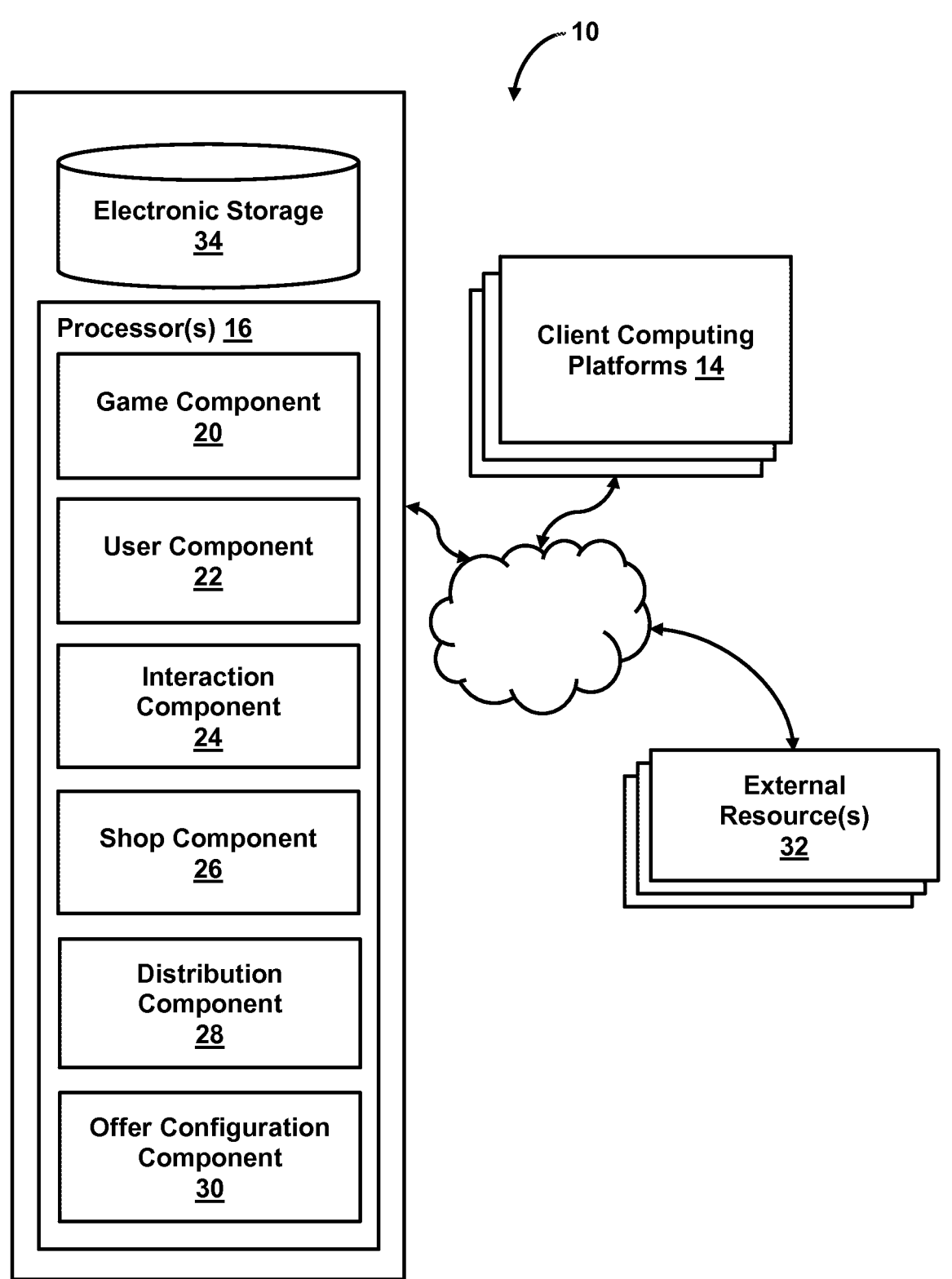
FIG. 1 illustrates a system that provides virtual items to users of a virtual space, in accordance with one or more implementations.

FIG. 1 illustrates a system 10 that provides virtual items to users of a virtual space. Providing virtual items to users of an online game may include providing the virtual items to a first set of users only after at least a threshold number of a first set of users satisfy one or more conditions. Such conditions, for example, may be that a threshold number of users have purchased the virtual item in a virtual shop associated with a virtual space. Another aspect of the disclosure relates to providing virtual items that increase in potency with an increase in the number of users of the set of users that satisfy one or more conditions. Such conditions, for example, may be that the users have exchanged virtual currency for the virtual item, and each time a user from the set of users obtains the virtual item, the potency of that virtual item increases, such that all the users of the set of users who have purchased the virtual item receive the same higher potency virtual item.

The virtual space may be hosted over a network. Providing the virtual space may include hosting the virtual space over a network. In some implementations, system 10 may include a server 12. The server 12 may be configured to communicate with one or more client computing platforms 14 according to a client/server architecture. The users may access system 10 and/or the virtual space via client computing platforms 14.

The server 12 may be configured to execute one or more computer program components. The computer program components may include one or more of a game component 20, a user component 22, a relationship component 24, a shop component 26, a distribution component 28, an offer configuration component 30, and/or other components.

The game component 20 may be configured to facilitate participation by multiple users in an online game through client computing platforms 14 associated with the users. The online game may be implemented within a virtual space. As used herein, virtual space and online game may be synonymous. The game component 20 may be configured to implement the instance of the virtual space executed by the computer components to determine state of the virtual space. The state may then be communicated (e.g., via streaming visual data, via object/position data, and/or other state information) from server 12 to client computing platforms 14 for presentation to users. The state determined and transmitted to a given client computing platform 16 may correspond to a view for a user character being controlled by a user via the given client computing platform 16. The state determined and transmitted to a given client computing platform 16 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which state of the virtual space is determined by game component 20 is not intended to be limiting. The game component 20 may be configured to express the virtual space in a more limited or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game component 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through game component 20).

The instance of the virtual space and/or the game that takes place therein may be persistent. That is, the virtual space and/or the game may continue on whether or not individual players are currently logged in and/or participating in the game. A user and/or player that logs out of the virtual space and then logs back in some time later may find the virtual space has been changed through the interactions of other players with the virtual space during the time the user and/or player was logged out. These changes may include changes to the simulated physical space, changes in the player's inventory, changes in other player's inventories, changes experienced by non-player characters, and/or other changes.

Processors may be configured by machine-readable instructions to manage user accounts, wherein the user accounts are associated with the users. For example, user component 22 may be configured to manage user accounts, wherein the user accounts are associated with the users. The user accounts of the users may include indications of one or more affiliations having a functional significance between users. For example, the accounts of users may include a first user account for a first user having an indication that the first user is associated with a first affiliation, and may have a second user account for a second user having an indication that the second user is associated with the first affiliation.

The user component 22 may be configured to access and/or manage one or more user profiles and/or user information associated with users of the system 12. The one or more user profiles and/or user information may include information stored by server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

An interaction component and/or the user component 22, may be configured to monitor interactions of the users with the virtual space and/or each other within the virtual space. This may include monitoring for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction component in monitoring the interactions of the users may be stored to the user profiles managed by user component.

At a given time, the interaction component may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction component may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space and/or other activity parameters.

The relationship component 24 may be configured to establish relationships and/or affiliations between users within the virtual space. Such affiliations may include one or more of friendships, guilds (with guild-mates), alliances, connections, followers, and/or other relationships. The relationship component 24 may establish relationships based on relationship requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. Affiliations may include one or more types of affiliations that have a functional purpose or impact within the virtual space, and/or one or more types of affiliations that a social construct within the virtual space that does not have a functional result.

The user accounts of the users may include indications of one or more affiliations having a functional significance between users. For example, the accounts of users may include a first user account for a first user having an indication that the first user is associated with a first affiliation, and may have a second user account for a second user having an indication that the second user is associated with the first affiliation.

The first user and the second user may be members of the same affiliation having a functional significance within the online game. Users belonging to an affiliation may have relationships with some or no functional significance, purpose, and/or impact within a given virtual space. Such relationships within the affiliation may include a leadership structure, a role structure, and/or other relationships within the affiliation. The functional significance of an affiliation and/or relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as obtaining, acquiring, sharing, and/or trading goods, services, player characters, and/or items in the virtual space; and/or other capabilities among users belonging to an affiliation.

The shop component 26 may be configured to effectuate presentation of offers to sell virtual items to the users on the client computing platforms associated with users. The shop component 26 may be configured to facilitate selection and/or entry by the users of an acceptance of the offer.

Figure 2:
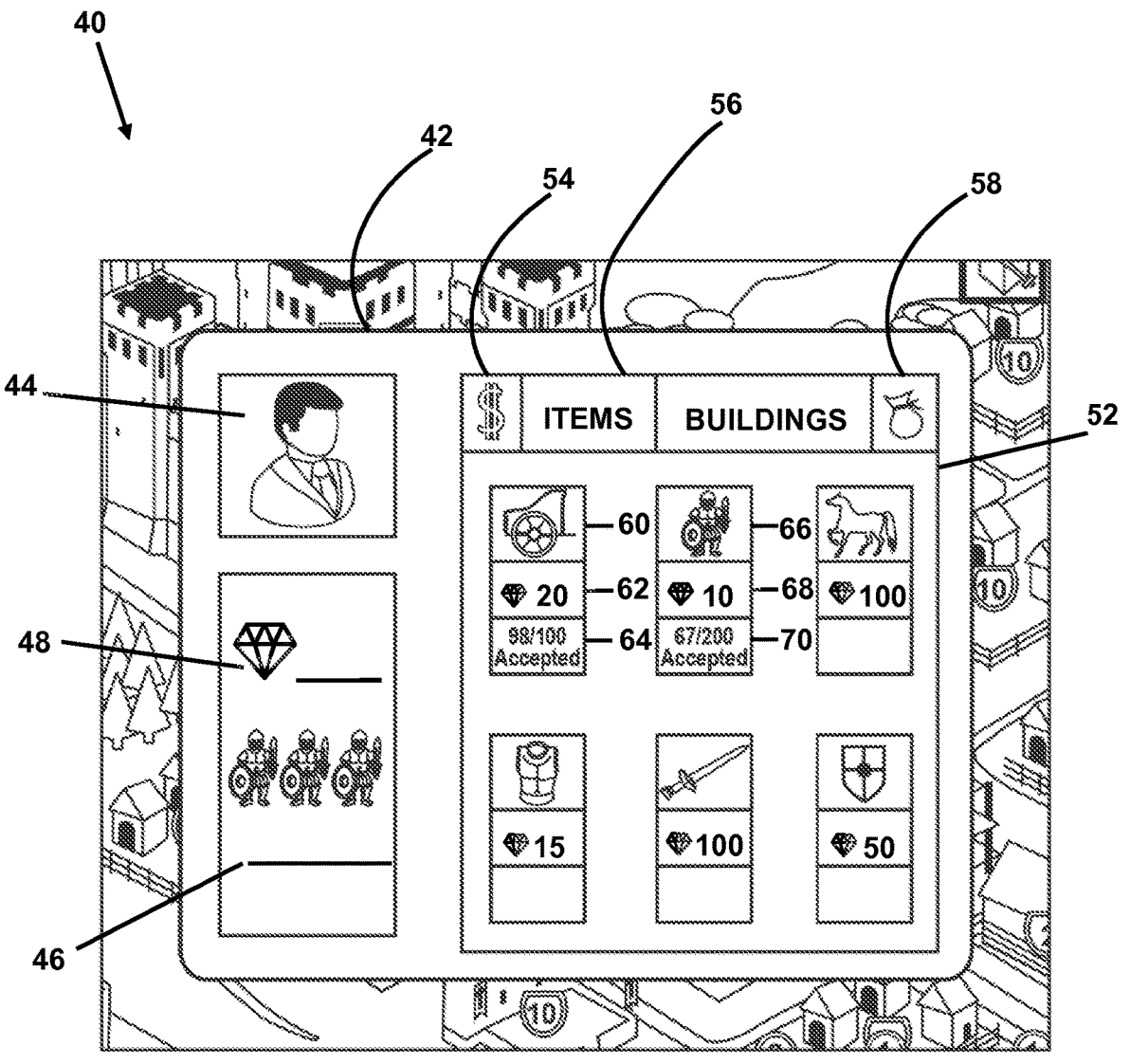
FIG. 2 illustrates a user interface presented to users on one or more client computing platforms.

FIG. 2 illustrates a user interface 40 presented to users on one or more client computing platforms 14 (as shown in FIG. 1). The shop component 26 may be configured to cause the user interface 40 to facilitate the presentation of views of a virtual shop 42 to users of the virtual space. The user interface 40 may provide a representation of an online game to the user. Within the representation of the online game a user may cause entry and/or selection of an indication of a desire to enter the virtual shop interface 42. In response to an interaction by the user of the online game, the shop component 26 may be configured to effectuate presentation of a shop interface 42 to users in conjunction with presentation of views of the online game, wherein the shop interface 42 is configured to facilitate presentations to users of offers to sell virtual items to the users on the client computing platforms 14 associated with the users, wherein the virtual items are usable within the game. The presentation to users of an offer to sell virtual items may comprise an indication of the virtual item associated with the offer and an indication of the associated user cost, such that a first offer 60 to sell virtual items includes a first associated user cost 62, and a second offer 66 includes a second associated user cost 68. The associated user cost, may be an amount of virtual currency, real currency, one or more virtual items, and/or other items available to the user to exchange for the offer. Virtual currency may take any form, for example, virtual currency may be in the form of gems, stones, metals, credits, dollars, and/or any other representation of a virtual currency.

A first offer 60 to sell virtual items may be presented to the first user and the second user through the shop interface 40, and the first user and the second user may select and/or enter their desire to accept the first offer 60 in exchange for an associated user cost 62. The accounts of users may include a third user account for a third user having an indication that the third user is associated with a second affiliation. Presentation of the first offer 60 to sell virtual items to the third user may be effectuated through the shop interface 42. The first user and second user may be a member of a first affiliation, and the third user may be a member of a second affiliation different from the first affiliation. All of the users may be presented the same offer to purchase virtual items, such that the first and second users, and the third user may be presented the first offer 60 to purchase virtual items. The first and second users, and the third user may be presented the first offer 60 having a first associated user cost 62, alternatively, the first and second users may be presented the first offer 60 having a first associated user cost 62, and the third user may be presented the first offer 60 having a different associated user cost.

The distribution component 28 may be configured to effectuate distribution of the virtual items of the selected offer to the users having one or more affiliations in response to an indication that a threshold number of users associated with one or more affiliations have accepted the offer. For example, the virtual items associated with the first offer 60 may be provided to the first user and the second user in response to an indication that a threshold number of users associated with the first affiliation, of which the first user and the second user are members, have accepted the first offer 60. The third user, being associated with a second affiliation, different from the first affiliation, may not receive the virtual items associated with the first offer 60, if a threshold number of members associated with the second affiliation failed to accept the first offer.

Distributing virtual items to users of an affiliation only when a threshold number of users have accepted the first offer, and having a user cost associated with the offer, will increase revenue and encourage conversion of users through social pressure to accept the offer, thereby increasing revenue for the provider of the virtual space.

A threshold number of members of an affiliation may be a specified number of users of an affiliation, a percentage of members of the affiliation, a specified number of a particular sub-class of users, a rate of acceptance by users in an affiliation, and/or other numbers of users within the affiliation. Sub-classes of users within an affiliation may be users that are leaders, members with a particular role, and/or other relationship within the affiliation. A rate of acceptance by users of an offer may include a requirement that users of an affiliation accept offers at a defined rate, such as 10 per minute, 100 per hour, or other rate of acceptance.

Distribution of the virtual items associated with offers may be effectuated to the users having one or more affiliations in response to an indication that the users of the one or more affiliations have accepted the offers at a defined rate of acceptance. For example, in order to receive the virtual items, the offers may have to be accepted at a rate of one per minute, ten per five minutes, one per ten seconds, etc., over a defined period of time.

The presentation of offers to sell virtual items to users on client computing platforms 14 associated with users may include a notification of the threshold number of users having an affiliation required to accept the offer before the virtual items associated with the offer are distributed to the users. Such that a first user, having a first affiliation, is offered a first offer 60 to sell virtual items that includes a threshold indication 64 notifying the first user of the threshold number of users having the first affiliation that are required to accept the first offer 60 before the virtual items associated with the first offer 60 are distributed to the users.

In some instances, when a threshold number of users of an affiliation have failed to accept the offer to purchase virtual items, those users who have accepted the offer in exchange for, say, virtual currency, may forfeit the virtual currency exchanged. Forfeiting the virtual currency incentivizes those users associated with an affiliation who have accepted the offer to pressure the users of an affiliation who have not accepted the offer to do so. In other instances, the users who have accepted the offer may not forfeit the virtual currency exchanged, either by receiving a refund of the virtual currency, or by it not being taken from accounts associated with the users until the occurrence of an event determining that a threshold number of users of an affiliation have, or have not, accepted the offer.

The virtual items associated with the offers to sell virtual items may be distributed to only those users having an affiliation who have accepted the offer. The virtual items associated with the offers to sell virtual items may be distributed to all users having an affiliation upon an indication that the threshold has been satisfied.

The amount of the associated user cost of the offer to sell virtual items may vary with the amount of users having a common affiliation that accept the offer, such that the first associated user cost 62 for the first offer 60 may vary with the amount of users having the first affiliation whom accept the first offer 60. In some implementations, the more users who accept the offer, the lower the associated user cost of the offer, thereby incentivizing users having a common affiliation to accept the offer. For example, each time a set of users comprising one or more users having a first affiliation accept the first offer 60 the first associated user cost 62 may reduce. In such implementations, users who have accepted the offer at the higher associated user cost may, or may not, receive the offer at the reduced associated user cost, as desired by the provider of the virtual space.

Within the presentation of the virtual shop interface 42, user information may be provided such a representation of the user's avatar 44 and/or identifying information 46 of the user which may include one or more attributes and/or game play metrics 48 of the user. For example, one or more attributes and/or game play metrics 48 of the user may comprise an indication of the amount of virtual currency held in credit for the user, an indication of the inventory of the user, an indication of levels of one or more parameters of the user, such as strength, speed, skill, power, special abilities and/or other parameters. The shop interface 42 may comprise one or more tabs. Tabs may be panels, views, control buttons, and/or other graphical representation of one or more groupings within the virtual shop. One tab may be a virtual currency tab 54 indicating that the user may obtain virtual currency for using in the online game. Other tabs may include a virtual items tab 56 indicating offers to sell virtual items to users wherein the virtual items are usable in the online game by the user. Virtual items usable in the online game may be broken down further by category or type, such as weapons, tools, clothing, food, resources, buildings, and/ or other virtual item categories within the virtual space and/or online game. Another tab may be an inventory tab 58 providing an indication of the virtual items the user has in their inventory. An inventory associated with a user may be stored in a user account for the user managed by the user component 22. When the shop component 28 is causing the virtual shop interface 42 to present offers to users to sell virtual currency in exchange for consideration, wherein the consideration is an amount of real currency, the shop component 26 may be supported by an e-commerce component configured to facilitate obtaining real world currency from the users for the online game provider.

The virtual items associated with the offers to sell virtual items may have one or more benefit levels associated with a benefit provided to users. A benefit provided to users by one or more virtual items may be an increase in the user's and/or a user character's strength, power, skill, and/or abilities compared to other users of the virtual space. For example, a user may have one or more associated troop units with the benefit provided to the user being a defensive benefit, an offensive benefit, and/or other military benefits within the game. As another example, a user may be one or more resource gathering units with the benefit provided to the user being a resource gathering benefit, and/or other benefits provided within the game.

The benefit level associated with a benefit provided by the virtual items of the offer to sell virtual items may vary with the amount of users having a common affiliation that have accepted the offer. The virtual items of the first offer to sell virtual items may include a first benefit level associated with a first benefit provided to a first user. The first benefit level of the first offer may vary with the amount of users having the first affiliation whom accept the first offer. In some instances, the more users having a first affiliation that accept the offer, the higher the benefit level of the virtual item associated with the offer. In such implementations, every-time a user from a first affiliation accepts an offer to purchase, say, troops, the number of troops received increases by a defined amount, such that all users of the first affiliation who have accepted the offer to purchase troops receive the increased number of troops. An increase in the number of troops may increase the benefit provided to the user, wherein the benefit may be a defensive benefit, an offensive benefit, and/or other military benefits within the game. As another example, where the virtual item is a resource gathering unit, the greater the number of users of an affiliation that accept the offer the greater the ability of the resource gathering to gather resources, thereby increasing the benefit to the user.

With reference to FIG. 2, the shop component 26 may be configured to cause the shop interface 42 to present a second offer 66 to sell virtual items having a second associated user cost 68 and a benefit level indication 70 associated with the virtual items of the second offer 70. The benefit level indication 70 may provide an indication to the first user and second user of a benefit level provided by the virtual items for the first and second users in the virtual space. The benefit level indication 70 may provide an indication to the first user and the second user of an increased benefit provided to the users in the virtual space should the first or second user accept the second offer 66. In response to the first user accepting the second offer 66, the shop component 26 may be configured to cause the benefit level notification 70 to update to indicate to the second user an increased benefit provided to the users in the virtual space should the second user accept the second offer 66.

Presentation of the offers to sell virtual items to the users on the client computing platforms may be effectuated during a defined period, thereby giving users belonging to an affiliation a defined period of time to accept the offer and secure it for their co-affiliation users. Individual ones of users of an affiliation may have relationships with some or no functional significance, purpose, and/or impact within a given virtual space. Such relationships within the affiliation may include a leadership structure, a role structure, and/or other relationships within the affiliation. Individual ones of such users may have control over the parameters of the defined period that the offers to sell virtual items are presented to users having an affiliation. Such individual users may be the owner, controller, leader, commander, and/or have another position within the affiliation. A first user having a first affiliation and a first relationship within the first affiliation may define the period of time during which presentation of the offers to sell virtual items to users having the first affiliation is effectuated. Before the start of the period to accept the virtual offers begins, the first user may notify all other members of the affiliation when the period is scheduled to begin and end, thereby incentivizing users having the affiliation to access the virtual space and the virtual shop interface 42 during that period. As a result the likelihood that a threshold number of affiliation members accept the offer is increased, thereby allowing the affiliation members to benefit from the offer.

The shop component 26 may be configured to effectuate presentation to users of a notification of the period during which the offer to sell virtual items must be accepted in order to receive the virtual items associated with the offer. Other components may facilitate the notification of users that such a period to accept an offer has been arranged, is pending, and/or has ended.

Allowing a user having an affiliation to control the period that the offer is available to the users belonging to the affiliation imparts control and structure into the affiliation, thereby increasing the social pressure on users of the affiliation to accept the offer and thereby increase revenue for the provider of the virtual space.

The virtual items in the offers to sell virtual items may include a set of potential awards having a set of award probabilities. The system may stochastically or quasi-stochastically select a first potential award from the set of potential awards as an actual award for distribution to users who have accepted the offer. The set of potential awards may include a desired award, such as a rare virtual item, or a virtual item having a usually high associated user cost. The probability of selecting the desired award as the actual award, for distribution to individual ones of the users who have accepted the offer, may increase with the number of users of the first set of users who have accepted the offer.

The shop component 26 may be configured to effectuate presentation of a set of potential awards associated with an offer to sell virtual items. Within the set of potential awards there may be virtual items which have varying degrees of variability. For example, one of the virtual items may be a rare item providing a benefit to users of the online game.

Another item may be a common virtual item that is easily obtained by users without having to make purchases through the virtual shop interface 42. By accepting the offer, users may increase the probability that they will receive the rare virtual item and decrease the probability that they will receive the common virtual item. Each time a user having an affiliation accepts the offer, the probability of receiving the rare virtual item may increase for all members of the affiliation who have accepted the offer.

Figure 3:
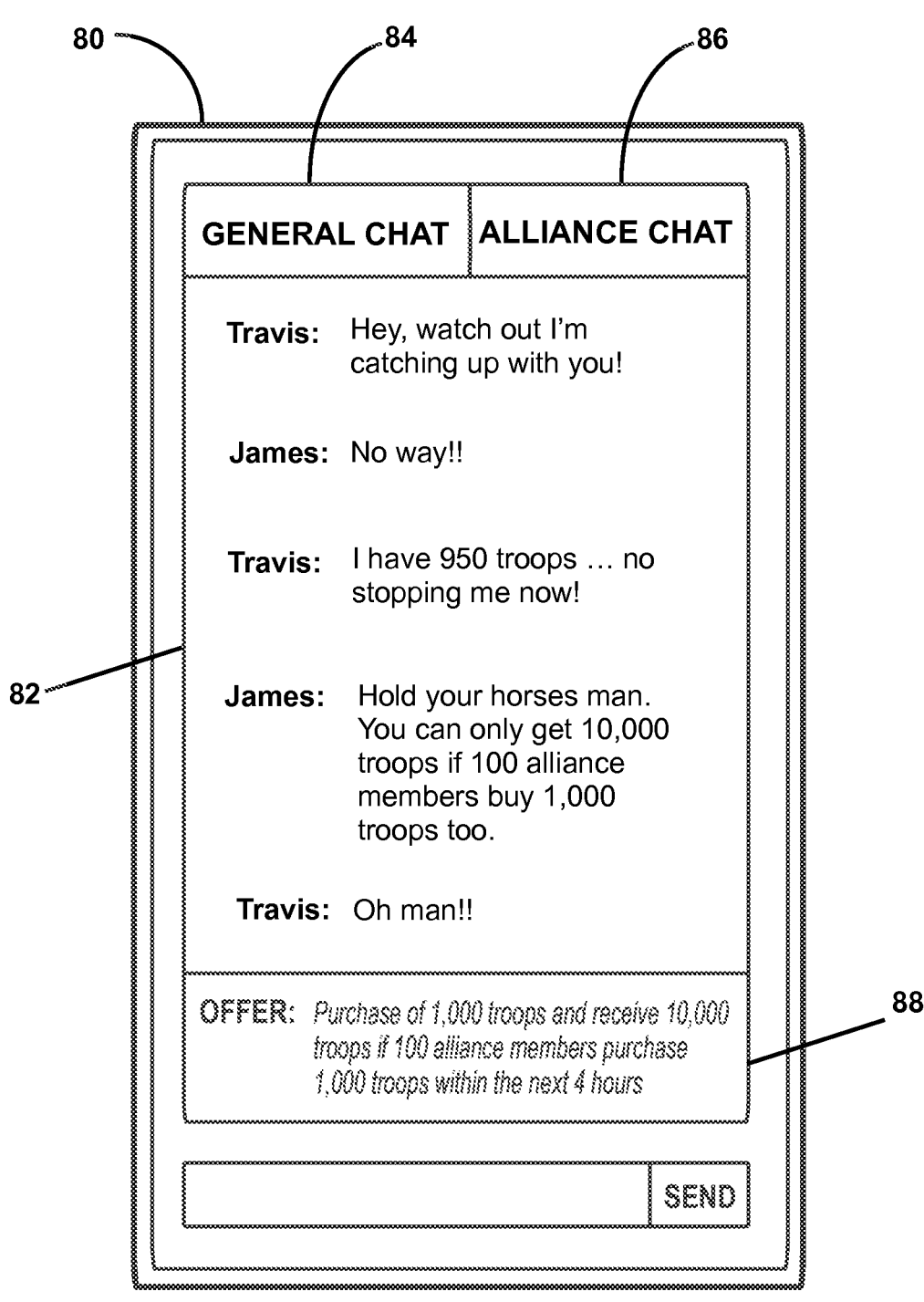
FIG. 3 illustrates a user interface configured to facilitate providing offers to sell virtual items to users, in accordance with one or more implementations.

FIG. 3 illustrates a user interface 80 configured to facilitate providing offers 88 to sell virtual items to users. The offer 88 to sell virtual items is presented to users through a communication interface 82 configured to facilitate communication between users of a virtual space. Such communication interface 80 may comprise separate communication tabs, a general communication tab 84 and an affiliation communication tab 86. When the user interacts with the interface 80 to select the general communication tab 84, the user may communicate with all users of the virtual space. When the user interacts with the interface 80 to select the affiliation communication tab 86, the user may communicate only with users associated with that affiliation.

An offer 88 to sell virtual items to users having a common affiliation may be presented through the affiliation communication chat interface 82 associated with that common affiliation. The communications interface 80 may be configured to allow users having the common affiliation to accept the offer through the communications interface 80 by interacting with the communications interface 80 indicating a desire to accept the offer. The communications interface 80 may be configured to allow users having a common affiliation to interface with the communications interface 80 indicating that the users desire to accept the offer and the shop component 26 may be configured to effectuate presentation of the shop interface 42 to the users.

The offer configuration component 30 may be configured to facilitate the entry and/or selection of parameters associated with the offers to sell virtual items to multiple users of system 10. Such parameters may include an indication of the identity of the virtual items to be offered, an associated user cost for the offer, a threshold number of users required to accept the offer before the associated virtual items are distributed to the users, the type of threshold (e.g., a percentage, a number, a subset of users), a time period during which the offer may be offered, a required rate of acceptance, an indication whether a user having an affiliation may determine one or more parameters of the offer, an indication of where in the virtual space the offer will be presented to users having an affiliation, and/or other parameters associated with the affiliation.

The server 12, client computing platforms 14, and/or external resources 32 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or external resources 32 may be operatively linked via some other communication media.

A given client computing platform 14 may include one or more processors configured to execute computer program components. The computer program components may be configured to enable an expert or user associated with the given client computing platform 14 to interface with system 10 and/or external resources 32, and/or provide other functionality attributed herein to client computing platforms 14.

By way of non-limiting example, the given client computing platform 14 may include one or more of a desktop computer, a laptop computer, a handheld computer, a tablet computing platform, a NetBook, a Smartphone, a gaming console, and/or other computing platforms.

The external resources 32 may include sources of information, hosts and/or providers of virtual environments outside of system 10, external entities participating with system 10, and/or other resources. In some implementations, some or all of the functionality attributed herein to external resources 32 may be provided by resources included in system 10.

The server 12 may include electronic storage 34, one or more processors 16 and/or other components. The server 12 may include communication lines or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 34 may comprise electronic storage media that electronically stores information. The electronic storage media of electronic storage 34 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 34 may include one or more virtual storage resources (e.g., cloud storage, a virtual private network, and/or other virtual storage resources). Electronic storage 34 may store software algorithms, information determined by processor 16, information received from server 12, information received from client computing platforms 14, and/or other information that enables server 12 to function as described herein.

Processor(s) 16 is configured to provide information processing capabilities in server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute components 20, 22, 24, 26, 28, 30, and/or other components. Processor 16 may be configured to execute components 20, 22, 24, 26, 28, 30, and/or other components by software; hardware; firmware; some combination of software, hardware, and/or firmware; and/or other mechanisms for configuring processing capabilities on processor 16.

It should be appreciated that although components 20, 22, 24, 26, 28, 30 are illustrated in FIG. 1 as being co-located within a single processing unit, in implementations in which processor 16 includes multiple processing units, one or more of components 20, 22, 24, 26, 28, 30, and/or other components may be located remotely from the other components. The description of the functionality provided by the different components 20, 22, 24, 26, 28, 30, and/or other components described below is for illustrative purposes, and is not intended to be limiting, as any of components 20, 22, 24, 26, 28, 30, and/or other components may provide more or less functionality than is described. For example, one or more of components 20, 22, 24, 26, 28, 30, and/or other components may be eliminated, and some or all of its functionality may be provided by other ones of 20, 22, 24, 26, 28, 30, and/or other components. As another example, processor 16 may be configured to execute one or more additional components that may perform some or all of the functionality attributed herein to one of components 20, 22, 24, 26, 28, 30, and/or other components.

FIG. 4 illustrates a method 90 of providing virtual items to users of a virtual space. The operations of method 90 presented below are intended to be illustrative. In some embodiments, method 90 may be accomplished with one or more additional operations not described, and/or without one or more of the operations discussed. Additionally, the order in which the operations of method 90 are illustrated in FIG. 4 and described below is not intended to be limiting.

In some embodiments, method 90 may be implemented in one or more physical processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 90 in response to instructions stored electronically on an electronic storage medium. The one or more processing devices may include one or more devices configured through hardware, firmware, and/or software to be specifically designed for execution of one or more of the operations of method 90.

At an operation 92, participation by multiple users in an online game is facilitated through client computing platforms associated with the users. Such operations may be performed by a game component, such as game component 20, in accordance with one or more implementations.

At an operation 94, user accounts are managed wherein the user accounts are associated with the users and include indications of one or more affiliations having a functional significance between users, such that the accounts of users include a first user account for a first user having an indication that the first user is associated with a first affiliation, and a second user account for a second user having an indication that the second user is associated with the first affiliation. The accounts of users may include a third user account for a third user having an indication that the third user is associated with a second affiliation. Such operations may be performed by a user component, such as user component 22, in accordance with one or more implementations.

At an operation 96, a presentation of offers to sell virtual items to users on the client computing platforms may be effectuated. At an operation 96 selection and/or entry by the users of an acceptance of the offer may be facilitated, such that a first offer to sell virtual items is presented to the first user and the second user. Presentation of the first offer to sell virtual items to the third user may be effectuated. Presentation of the offers to sell virtual items to the users on the client computing platforms during a defined period may be effectuated. Such operations may be performed by a shop component, such as shop component 26, in accordance with one or more implementations.

The offers to sell virtual items include an associated user cost, such that the first offer to sell virtual items includes a first associated user cost. The amount of the associated user cost of the offer to sell virtual items varies with the amount of users having a common affiliation that accept the offer, such that the first associated user cost for the first offer varies with the amount of users having the first affiliation whom accept the first offer.

The virtual items of the offers to sell virtual items has one or more benefit levels associated with a benefit provided to users, such that the virtual items of the first offer to sell virtual items includes a first benefit level associated with the first benefit provided to user. The benefit level associated with a benefit provided by the virtual items of the offer to sell virtual items varies with the amount of users having a common affiliation that accept the offer, such that the first benefit level of the first offer varies with the amount of users having the first affiliation whom accept the first offer.

The virtual items in the offers to sell virtual items includes a set of potential awards having a set of award probabilities, and wherein the one or more physical processors is configured to stochastically or quasi-stochastically select a first potential award from the set of potential awards as an actual award for distribution to users who have accepted the offer. The set of potential awards includes a desired award wherein the probability of selecting the desired award as the actual award, for distribution to individual ones of the users who have accepted the offer, increases with the number of users of the first set of users who have accepted the offer.

At an operation 98, a determination of whether an offer expiration event has occurred is made. Such an offer expiration event may be expiration of the period of time that the offer is made available to the users having an affiliation, a failure to comply with the threshold requirements of the offer, and/or other offer expiration events. Such operations may be performed by a distribution component, such as distribution component 28, in accordance with one or more implementations.

At an operation 100, a determination of whether a threshold number of users having an affiliation have accepted an offer is made. Such operations may be performed by a distribution component, such as distribution component 28, in accordance with one or more implementations.

At an operation 102, in response to a determination that a threshold number of users having an affiliation have accepted the offer, distribution of the virtual items to the users having one or more affiliations in response to an indication, at operation 100, that a threshold number of users associated with one or more affiliations have accepted the offer is made, such that the virtual items associated with the first offer are provided to the first user and the second user in response to an indication that a threshold number of users associated with the first affiliation have accepted the first offer. Distribution of the virtual items of the offers to the users having one or more affiliations may be effectuated in response to an indication that the users of the one or more affiliations have accepted the offers at a defined rate of acceptance. Such operations may be performed by a distribution component, such as distribution component 28, in accordance with one or more implementations.

At other operations, control by individual ones of users having an affiliation of the parameters of the defined period may be facilitated, such that the first user having the first affiliation defines the period during which presentation of the offers to sell virtual items to users having the first affiliation is effectuated.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that presents offers to users of an online game, wherein at least some of the users are affiliated within affiliations of multiple users, wherein the affiliations include a first affiliation including at least a first user and a second user that are affiliated within the first affiliation upon requesting to join the first affiliation, the system comprising:

one or more physical processors configured by machine-readable instructions to:

execute, by a game component, an instance of the online game;

within the online game, cause a first presentation to the first user of a first user communication interface within the online game, wherein the first user communication interface is configured to provide, to the first user, communication to at least some of the users of the online game that are not affiliated within the first affiliation;

within the online game, cause a second presentation to the first user, the second user, and other users that are affiliated within the first affiliation, wherein the second presentation presents a second user communication interface within the online game, wherein the second user communication interface is configured to provide communication between the users of the online game that are affiliated within the first affiliation;

within the online game, cause a third presentation to the first user, the second user, and the other users that are affiliated within the first affiliation, wherein the third presentation presents a first offer to obtain a first set of virtual items including a first virtual item, wherein the first offer is presented through the second user communication interface within the online game, wherein the first offer is associated with parameters that are included in the third presentation, wherein the parameters include:

(i) information regarding the first set of virtual items, and (ii) one or more characteristics of the first virtual item included in the first set of virtual items, and wherein the third presentation notifies the first user and the second user that at least one of the one or more characteristics of the first virtual item will be adjusted to improve the first virtual item responsive to at least a threshold number or percentage of acceptances of the first offer by the users that are affiliated within the first affiliation, wherein the third presentation further includes a threshold indication representing a current number or percentage of acceptances of the first offer that have been accepted by the users that are affiliated within the first affiliation;

receive information indicating the acceptances of the first offer by at least some of the users that are affiliated within the first affiliation, including a first acceptance of the first offer by the first user and a second acceptance of the first offer by the second user;

responsive to receiving the information indicating the acceptances of the first offer by at least some of the users that are affiliated within the first affiliation, modify the third presentation within the second user communication interface such that the threshold indication represents the current number or percentage of the acceptances that includes the first acceptance by the first user and the second acceptance by the second user;

distribute the first set of virtual items to the first user and to the second user;

responsive to receiving at least the threshold number or percentage of the acceptances, adjust at least one of the one or more characteristics of the first virtual item to improve the first virtual item.

2. The system of claim 1, wherein the first affiliation has a functional significance between the users of the online game that are affiliated within the first affiliation, wherein the functional significance persists across different gameplay sessions.

3. The system of claim 2, wherein the functional significance of individual ones of the one or more affiliations include one or more capabilities available to individual users by virtue of being part of the individual ones of the one or more affiliations, wherein the one or more capabilities are not available to other users that are not part of the individual ones of the one or more affiliations.

4. The system of claim 1, wherein the first offer is available during a defined period.

5. The system of claim 1, wherein the users interact with the online game through client computer platforms, wherein the client computing platforms include a first client computing platform associated with the first user, and wherein the first offer is presented to the first user on the first client computing platform.

6. The system of claim 5, wherein the one or more physical processors are further configured to:

generate game state information that is transmitted to the client computing platforms over a network, the game state information facilitating presentation of views of the online game to the users via the client computing platforms.

7. The system of claim 1, wherein the one or more physical processors are further configured to:

determine, by a distribution component, whether the number of the users that have accepted the first offer meets the threshold number or percentage of the acceptances of the first offer by the users that are affiliated within the first affiliation.

8. The system of claim 1, wherein an individual parameter of the parameters associated with the first offer includes a first associated user cost to be exchanged upon acceptance of the first offer.

9. A method for presenting offers to users of an online game, wherein at least some of the users are affiliated within affiliations of multiple users, wherein the affiliations include a first affiliation including at least a first user and a second user that are affiliated within the first affiliation upon requesting to join the first affiliation, the method performed by a computer system that includes one or more physical processors, the method comprising:

executing, by a game component, an instance of the online game;

within the online game, causing a first presentation to the first user of a first user communication interface within the online game, wherein the first user communication interface is configured to provide, to the first user, communication to at least some of the users of the online game that are not affiliated within the first affiliation;

within the online game, causing a second presentation to the first user, the second user, and other users that are affiliated within the first affiliation, wherein the second presentation presents a second user communication interface within the online game, wherein the second user communication interface is configured to provide communication between the users of the online game that are affiliated within the first affiliation;

within the online game, causing, by the one or more physical processors, a third presentation to the first user, the second user, and the other users that are affiliated within the first affiliation, wherein the third presentation presents a first offer to obtain a first set of virtual items including a first virtual item, wherein the first offer is presented through the second user communication interface within the online game, wherein the first offer is associated with parameters that are included in the third presentation, wherein the parameters include:

(i) information regarding the first set of virtual items, and (ii) one or more characteristics of the first virtual item included in the first set of virtual items, and wherein the third presentation notifies the first user and the second user that at least one of the one or more characteristics of the first virtual item will be adjusted to improve the first virtual item responsive to at least a threshold number or percentage of acceptances of the first offer by the users that are affiliated within the first affiliation, wherein the third presentation further includes a threshold indication representing a current number or percentage of acceptances of the first offer that have been accepted by the users that are affiliated within the first affiliation;

receiving information indicating the acceptances of the first offer by at least some of the users that are affiliated within the first affiliation, including a first acceptance of the first offer by the first user and a second acceptance of the first offer by the second user;

responsive to receiving the information indicating the acceptances of the first offer by at least some of the users that are affiliated within the first affiliation, modifying the third presentation within the second user communication interface such that the threshold indication represents the current number or percentage of the acceptances that includes the first acceptance by the first user and the second acceptance by the second user;

distributing the first set of virtual items to the first user and to the second user; and responsive to receiving at least the threshold number or percentage of the acceptances, adjusting at least one of the one or more characteristics of the first virtual item to improve the first virtual item.

10. The method of claim 9, wherein the first affiliation has a functional significance between the users of the online game that are affiliated within the first affiliation, wherein the functional significance persists across different gameplay sessions.

11. The method of claim 10, wherein the functional significance of individual ones of the one or more affiliations include one or more capabilities available to individual users by virtue of being part of the individual ones of the one or more affiliations, wherein the one or more capabilities are not available to other users that are not part of the individual ones of the one or more affiliations.

12. The method of claim 9, wherein the first offer is available during a defined period.

13. The method of claim 9, wherein the users interact with the online game through client computer platforms, wherein the client computing platforms include a first client computing platform associated with the first user, and wherein the first offer is presented to the first user on the first client computing platform.

14. The method of claim 13, further comprising:

generating game state information that is transmitted to the client computing platforms over a network, the game state information facilitating presentation of views of the online game to the users via the client computing platforms.

15. The method of claim 9, further comprising:

determining whether the number of the users that have accepted the first offer meets the threshold number or percentage of the acceptances of the first offer by the users that are affiliated within the first affiliation.

16. The method of claim 9, wherein an individual parameter of the parameters associated with the first offer includes a first associated user cost to be exchanged upon acceptance of the first offer.

* * * * *